United States Patent [19]

Denny et al.

[11] 4,231,887

[45] Nov. 4, 1980

[54] ZEOLITE AGGLOMERATES FOR DETERGENT FORMULATIONS

[75] Inventors: Arthur F. Denny, Katonah; John D. Sherman, Chappaqua, both of N.Y.

[73] Assignee: Union Carbide Corporation, New York, N.Y.

[21] Appl. No.: 52,190

[22] Filed: Jun. 26, 1979

[51] Int. Cl.[2] .......................... B01J 1/04; C11D 3/12; C11D 3/20; C11D 17/06

[52] U.S. Cl. ............................. 252/174.19; 23/313 R; 252/140; 252/174; 252/174.21; 252/174.25; 252/179; 252/DIG. 1; 264/117

[58] Field of Search ............. 23/313 R; 252/131, 140, 252/174.19, 174.21, 174.25, 179, 455 Z; 264/117

[56] References Cited

U.S. PATENT DOCUMENTS

| | | | |
|---|---|---|---|
| 3,700,599 | 10/1972 | Mizuno | 252/99 |
| 3,749,675 | 7/1973 | Chang | 252/135 |
| 3,761,415 | 9/1973 | Gould | 252/174.19 |
| 3,783,008 | 1/1974 | Weldes | 252/135 X |
| 4,083,793 | 4/1978 | Jacoki | 252/99 |
| 4,094,778 | 6/1978 | Denny et al. | 210/38 A |
| 4,096,081 | 6/1978 | Phenicie | 252/131 X |

FOREIGN PATENT DOCUMENTS

| | | | |
|---|---|---|---|
| 2736903 | 2/1978 | Fed. Rep. of Germany | 252/174.25 |
| 1429143 | 3/1976 | United Kingdom | 252/131 |

*Primary Examiner*—Dennis L. Albrecht
*Attorney, Agent, or Firm*—Richard G. Miller

[57] ABSTRACT

Zeolite agglomerates which when admixed with conventional laundry detergent formulations remain uniformly distributed and upon contact with hard water rapidly disperse and sequester the hardness cations thereof are comprised of zeolite crystals in a matrix of an ethoxylated linear alcohol and sodium citrate.

5 Claims, 6 Drawing Figures

ZEOLITE AGGLOMERATES FOR DETERGENT FORMULATIONS

Figure 1:
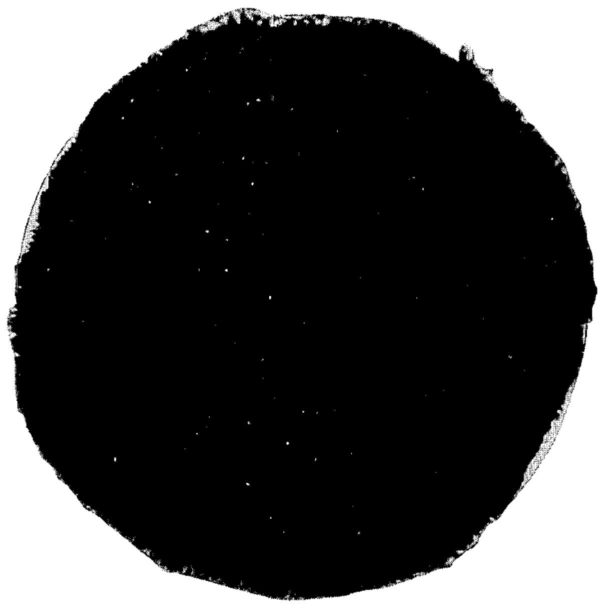

The present invention relates in general to surfactant compositions, and more particularly to zeolite-containing surfactant agglomerates suitable as adjuvants in low phosphate or phosphate-free household laundry detergent compositions.

It has heretofore been proposed to include the sodium cation forms of certain crystalline zeolites of the molecular sieve type in laundry detergent compositions to provide the water-softening function formerly performed by phosphate builders. The phosphate compounds have been found to be undesirable because of their adverse impact upon the environment.

Although the zeolites have been found to be excellent sequestering agents for the calcium and magnesium cations of hard water when thoroughly dispersed in the medium, considerable difficulties have been encountered in formulating zeolite-containing detergent compositions which permit rapid dissociation of the zeolite constituent from the other components of the composition. This failure results in insufficient softening of the water and deposition of undispersed agglomerates of zeolite-containing materials on the fabric being laundered. While, from the standpoint of maximum dispersibility, the zeolite constituent should be incorporated into the detergent formulation as individual crystals not adhering to any other constituent, it is found that the zeolite crystals will not remain uniformly distributed throughout the packaged detergent composition—an obvious disadvantage. On the other hand, incorporating the zeolite crystals into aggregates or particles of the total detergent composition by any common method, such as spray drying, results in their uniform distribution in the detergent composition, but slow dispersion throughout the water used in laundering. The reasons for this behavior are not fully understood, but it does not appear to be solely a function of the solubility of the matrix composition.

It is, therefore, the general object of the present invention to provide a zeolite-containing agglomerate which when admixed with conventional laundry detergents remains uniformly distributed during packaging, shipping and storing, and which upon contact with water rapidly disperses to distribute the zeolite crystals therethrough.

This and other objects which will be apparent from the specification are accomplished in accordance with the present invention by the agglomerate particles which comprise (a) crystals of a three-dimensional zeolite of the molecular sieve type containing ion-exchangeable alkali metal cations, said zeolite being contained in a combined matrix of an intimate mixture of (b) at least one or a mixture of two or more ethoxylated alcohols having the formula $R—O—(CH_2—CH_2—O)_nH$ wherein "R" is a primary or secondary alkyl group containing from 9 to 18, preferably 11 to 15 carbon atoms and "n" is a whole number of from 3 to 12 inclusive, said ethoxylated alcohol being present in an amount of 15 to 50 parts, preferably about 25 parts, by weight per 100 parts by weight of zeolite crystals (hydrated), and (c) sodium citrate, as the dihydrate, in an amount of 8 to 25 parts, preferably about 12 parts, by weight per 100 parts by weight of zeolite.

The ethoxylated alcohols are commercially available compositions and can be prepared by reacting a primary or secondary alcohol with from 3 to 12 moles of ethylene oxide. The physical properties of these compounds are exemplified by those shown in the following Table 1 for the species containing an average of 7, 9 and 12 moles of ethylene oxide respectively and a primary alcohol moiety containing from 12 to 15 carbon atoms.

| PROPERTY | ETHOXYLATED ALCOHOL | | |
|---|---|---|---|
| Average Moles Ethylene Oxide | 7 | 9 | 12 |
| Cloud Point, 1% Aqueous Solution (°C.) | 50 | 60 | 90 |
| HLB Value[(a)] | 12.4 | 12.8 | 14.2 |
| Color, APHA | 30 | 30 | 30 |
| Freezing Point, (°C.) | 20 | 21 | 27 |
| Pour Point, (°C.) | 23 | 24 | 30 |
| Viscosity, cs. at 38° C. | 35 | 39 | 52 |
| Flash Point, (°F.)[(b)] | 352 | 356 | 381 |
| Specific Gravity at 30/20° C. | 0.985 | 0.991 | 1.013 |
| Water Content, wt. % | 0.05 | 0.05 | 0.05 |
| pH, 1% Aqueous Solution | 6 | 6 | 6 |

[(a)]Calculated HLB = $\frac{\%\text{ Ethylene Oxide}}{5}$

[(b)]Pensky-Martens, Closed cup

It is preferred that the ethoxylated linear alcohol constituted contains an average of from 7 to 12 moles of ethylene oxide.

The functioning of the sodium citrate appears to be unique in that it imparts a necessary hardness or crispness to the agglomerates while at the same time permits the agglomerates to rapidly disintegrate upon contact with water. Two commonly employed ingredients in detergent formulations, namely sodium silicates and sodium carbonates, are found to fail as crisping agents in the present compositions. Either they do not impart the necessary hardness, or if they do, they seriously impede the dispersal of the zeolite crystals when the compositions are placed in water. Sone fail in both respects.

The particular species of zeolitic molecular sieve constituent employed is not a narrowly critical factor provided it contains cations which are exchangeable with the calcium and magnesium cations of hard water and which upon exchange do not introduce objectionable compounds into the water. These exchangeable cations are most commonly alkali metal cations, particularly sodium. Sodium zeolite A, as described in detail in U.S. Pat. No. 2,882,243, is highly preferred because of its ability to sequester calcium cations. Sodium zeolite X as described in U.S. Pat. No. 2,882,244, is also a particularly desirable species of zeolite for the present purposes. Moreover, mixtures of sodium zeolite A and sodium zeolite X containing about 40 to 70 weight percent of each species are found to exhibit a synergistic effect in sequestering calcium and magnesium cations when both are present in hard water. Such a mixture is used to advantage in the present compositions.

In preparing the present compositions any of several methods are suitably employed. In one procedure, warmed zeolite powder is added to a mixture of the ethoxylated alcohol in the molten state and the sodium citrate dissolved in the minimum amount of water necessary to dissolve the salt. Sufficient zeolite is used so that a formable mass is obtained. The mass is then formed into agglomerates of the desired shape and size and the agglomerates dried in air at 100° C. Suitable agglomeration techniques are those generally known in the art such as those of the tumbling type which tend to produce more nearly spherical particles which have better flow characteristics and attrition resistance.

The practice of the invention is illustrated by the following examples:

EXAMPLE 1

A solution was prepared by dissolving 9.1 grams of sodium citrate dihydrate in 9.1 grams of distilled water and then mixed with 18.2 grams of ethoxylated linear alcohol, R—O—$(CH_2—CH_2—O)_nH$ in which R is a primary alkyl group containing 12 to 15 carbon atoms and "n" has an average value of 12, the alcohol having been heated to slightly above its pour point. A two phase system results, one phase being the aqueous salt solution and the other, the molten alcohol. To this system was added, with stirring, 72.7 grams of hydrated sodium zeolite A powder preheated to 100° C. After thorough mixing, the mixture was dried in air at 100° C. for 1 hour. The dried solids were granulated and screened through sieves to obtain a 12×60 mesh (U.S. Standard Sieve Series) fraction. This batch was then pressed through a 20-mesh screen to obtain the final product. The particles were crisp and exhibited the capacity to remain separate (non-agglomerated) when handled and mixed with other constituents of typical detergent formulations. The bulk density of the particles ranged from about 0.64 gram/cc. to about 0.77 gram/cc., the lower value representing the condition of the bulk sample when newly poured into a container and the higher value being attained after settling in the container due to tapping. The dispersibility of the product in water at 30° C. as indicated by the "Denim Deposition Test," described hereinafter, was excellent. The test results are shown in FIG. 1 of the drawings.

EXAMPLE 2

When using ethoxylated linear alcohols in the lower part of the molecular weight range which tend to be lower melting and somewhat more difficultly emulsifiable with the sodium citrate solution, it is found that the better products are formed by first combining the zeolite and the sodium citrate solution and then adding the alcohol constituent thereto with stirring. Using this technique, 1200 grams of sodium zeolite A (hydrated) were placed in the bowl of a mixing apparatus and a solution of 150 grams of sodium citrate dihydrate in 475 grams of water was added while blending. Thereafter 300 grams of an ethoxylated linear alcohol, R—O—$(CH_2—CH_2—O)_nH$, in which R is a primary alkyl group containing from 12 to 15 carbon atoms and "n" has an average value of 7, at a temperature slightly above its pour point, were slowly added with blending to produce a homogeneous mixture. The mixture was extruded, dried at 100° C. and granulated to form 20×50 mesh (U.S. Standard Sieve Series) product. The product was very crisp and dispersed well in water as demonstrated by the Denim Deposition Test results shown in FIG. 2 of the drawings.

DENIM DEPOSITION TEST

This procedure is the method used herein to evaluate that portion of a powdered detergent composition which remains after a simulated washing cycle in the form of particles large enough to become enmeshed in or deposited on the laundered fabric and is detectable by visual inspection. The apparatus and materials employed are:

Standard heavy denim cloth
Sodium hexametaphosphate
Tergitometer: (Terg-O-Tometer Model No. 7243; U.S. Testing Co.)
Wash solution: 150 ppm hardness (expressed as ppm $CaCO_3$). $Ca^{++}/Mg^{++}$ ratio=3/2
Petri dish
Buchner funnel: 80 mm. diameter
Buchner flask: 1000 ml.
Glass Cylindrical Tube: 70 mm. I.D. by 300 mm. long
Drying oven The denim cloth as obtained from a commercial source is first washed in a conventional household washing machine using tap water and about one quarter of a cup of sodium hexametaphosphate to substantially remove any soluble sizing agent which may be present, and dried in a conventional household laundry drier. The denim is then cut into disc of about 80 mm. diameter to fit the Buchner funnel. The tergitometer bath is set at 30° C. and 500 ml. of standard wash solution is placed in one of the beakers of the apparatus and equilibrated in temperature with the bath. The composition to be tested (unless otherwise specified) is weighed out to provide a concentration of 0.60 grams of zeolite (anhy.) per liter of wash solution, and added to the wash solution while the apparatus is running at 100 rpm. A denim disc is placed in the Buchner funnel fitted to the Buchner flask and vacuum is applied to the flask using a conventional laboratory water aspirator. The denim disc is wetted with distilled water and then the end of the glass cylindrical tube is placed inside the funnel and pressed down upon the disc to seal the edge of the fabric against the funnel bottom. After the tergitometer has run for 5 minutes, the test sample is poured into the funnel through the glass tube and filtered through the denim disc. The disc is carefully removed from the funnel to a Petri dish and placed in a 100° C. oven to dry. The dried disc is then evaluated visually for solids on the disc.

Figure 2:
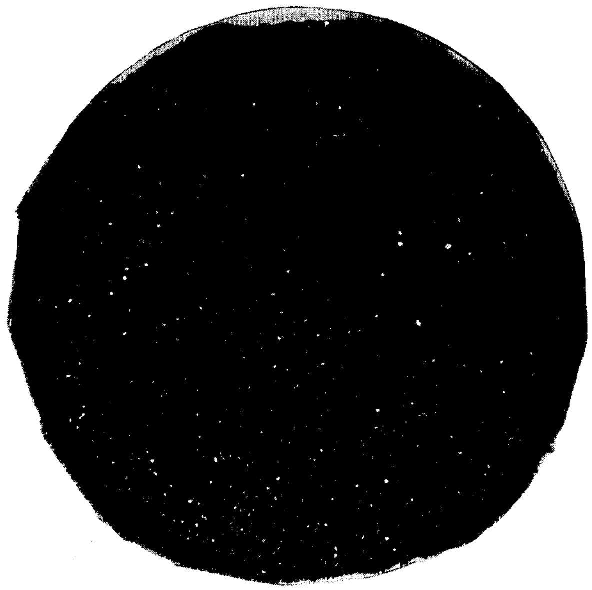
Figure 3:

Using the above-described test procedure, samples of the composition of Examples 1 and 2 were evaluated and compared with similar compositions in which the sodium citrate constituent was replaced with various amounts of hydrated sodium polysilicate or sodium carbonate. Photographs of the test discs of the compositions of Examples 1 and 2 are shown in FIG. 1 and FIG. 2 respectively in the drawings. The compositions of the comparison samples tested to produce the denim disc photographs of the other figures of the drawings are as follows:

FIG. 3: The composition contained 76.2 weight percent sodium zeolite A (hydrated); 19.0 weight percent of an ethoxylated linear alcohol R—O—$(CH_2—CH_2—O)_nH$ in which R is a primary alkyl group containing from 12 to 15 carbon atoms and "n" has an average value of 9; and 4.8 weight percent of hydrated sodium polysilicate ($SiO_2/Na_2O$ weight ratio=2.4). This composition was formed into 20×50 mesh particles in accordance with the procedure of Example 1. The crispness of this composition was marginal, i.e. was close to being too soft for the intended use in upgrading detergent compositions. Despite this softness which generally favors dispersibility, it is evident from the Denim Deposition Test disc of FIG. 3 that dispersibility was very poor for this composition.

Figure 4:
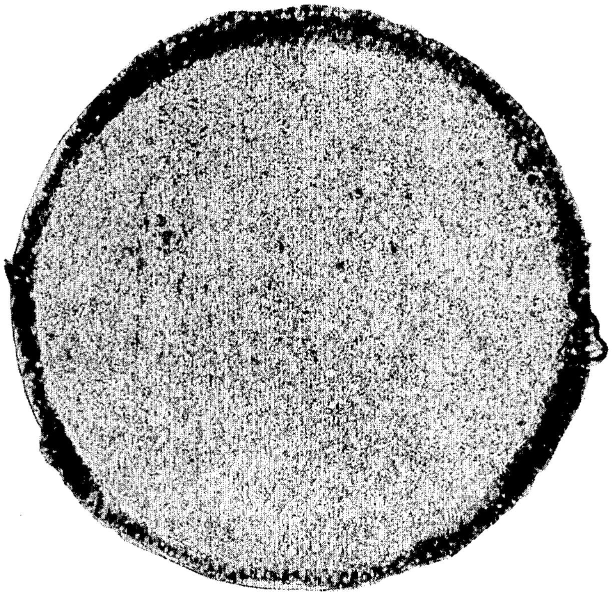

FIG. 4: The composition contained 45.5 weight percent sodium zeolite A (hydrated); 9.1 weight percent of the same ethoxylated linear alcohol as in the composition of FIG. 3; and 45.5 weight percent of sodium carbonate. The relatively large proportion of sodium carbonate was necessary in order to obtain product particles which had requisite hardness. Not only was the dispersibility of this composition poor as evidenced by the Denim Deposition Test, but the large amount of sodium carbonate unduly restricts the content of the active zeolite constituent and thereby disrupts the balance of the detergent composition to which the zeolite composition is added.

Figure 5:
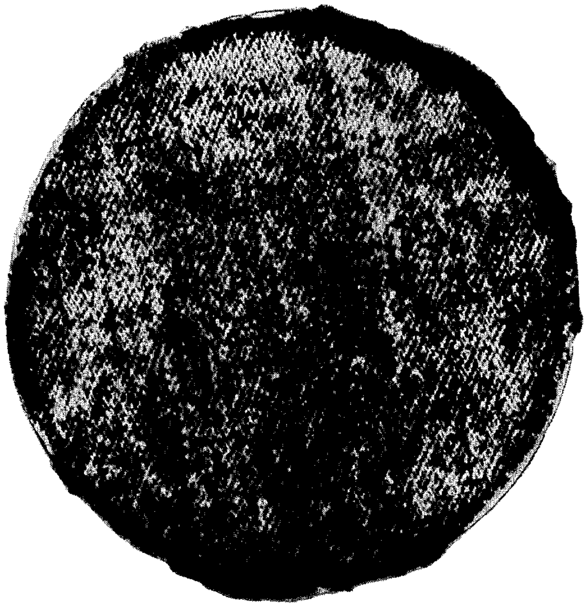

FIG. 5: This composition is a commercially available and widely distributed household laundry detergent powder containing approximately 6 percent phosphorus in the form of phosphates in combination with zeolite powder and sodium carbonate as sequestering agents for $Ca^{++}$ and $Mg^{++}$ ions. The other ingredients include anionic surfactants, sodium silicate, sodium sulfate, antiredeposition agents and whiteners. The zeolite constituent is an integral part of the detergent particles. It is apparent from the Denim Deposition Test results that the particles have very poor dispersibility in water.

Figure 6:

FIG. 6: This composition is also a commercially available household laundry detergent and is produced by the same manufacturer as the composition of FIG. 5. The principal difference in the two compositions is that the present one contains no phosphorus and presumably contains a larger proportion of zeolite. It disperses in water no better than the phosphate-containing composition.

What is claimed is:

1. Zeolite-containing agglomerate particles suitable for incorporation into detergent formulations which comprise (a) crystals of a three-dimensional zeolite of the molecular sieve type containing ion-exchangeable alkali metal cations, said zeolite being contained in a combined matrix of an intimate mixture of (b) at least one or a mixture of two or more ethoxylated alcohols having the formula $R—O—(CH_2—CH_2—O)_nH$ wherein "R" is a primary or secondary alkyl group containing from 9 to 18 carbon atoms and "n" is a whole number of from 3 to 12 inclusive, said ethoxylated alcohol being present in an amount of 15 to 50 parts by weight per 100 parts by weight of zeolite crystals (hydrated), and (c) sodium citrate, as the dihydrate, in an amount of 8 to 25 parts by weight per 100 parts by weight of zeolite.

2. Agglomerate particles according to claim 1 wherein the ethoxylated alcohol is present in an amount of about 25 parts per 100 parts by weight of zeolite and the sodium citrate is present in an amount of about 12 parts by weight per 100 parts by weight of zeolite.

3. Agglomerate particles according to claim 1 wherein the zeolite constituent comprises sodium zeolite A.

4. Agglomerate particles according to claim 1 wherein the zeolite constituent comprises sodium zeolite X.

5. Agglomerate particles according to claim 1 wherein the zeolite constituent comprises a mixture of sodium zeolite A and sodium zeolite X.

* * * * *